Feb. 23, 1932.    L. C. HUCK    1,846,257
BRAKE DRUM
Filed Nov. 19, 1928    2 Sheets-Sheet 1
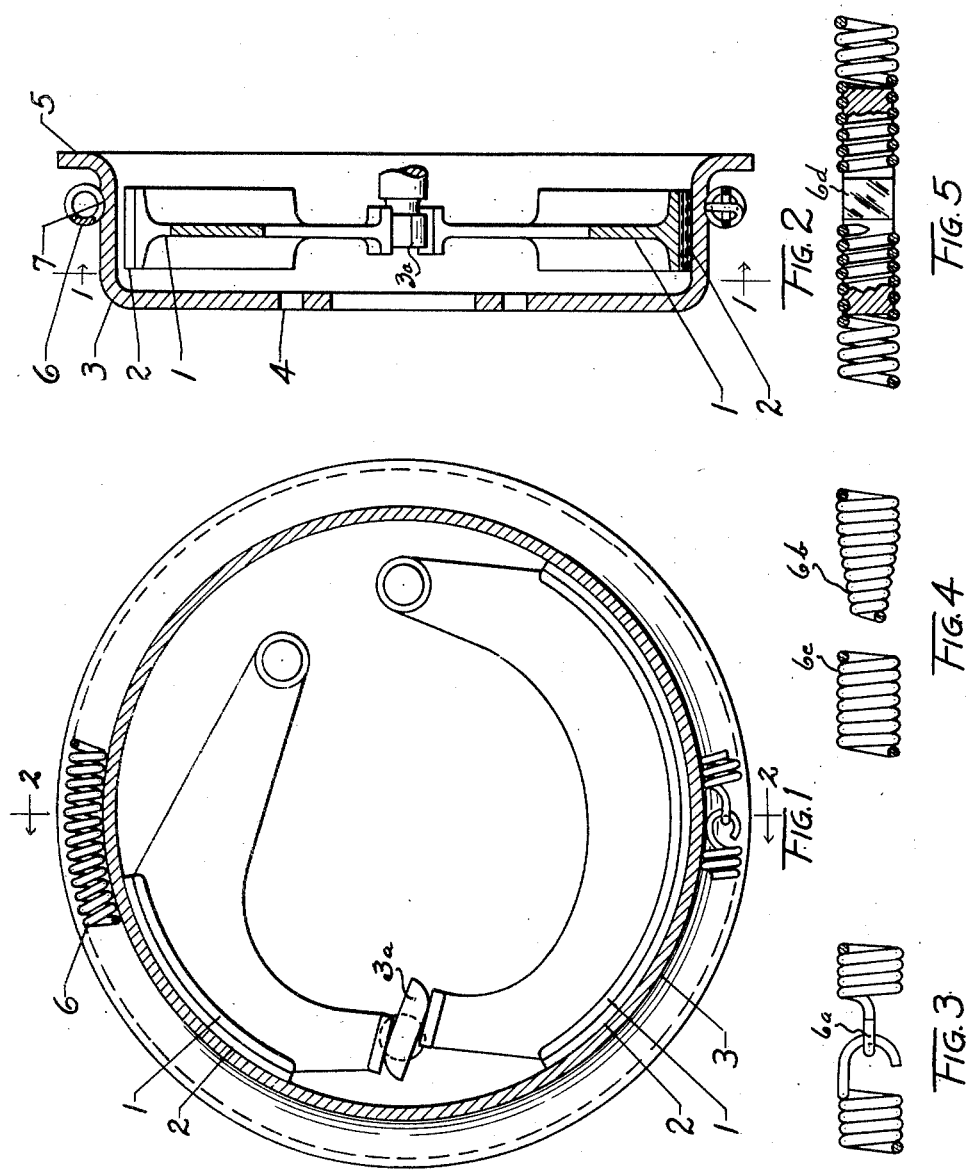

Feb. 23, 1932. L. C. HUCK 1,846,257
BRAKE DRUM
Filed Nov. 19, 1928  2 Sheets-Sheet 2
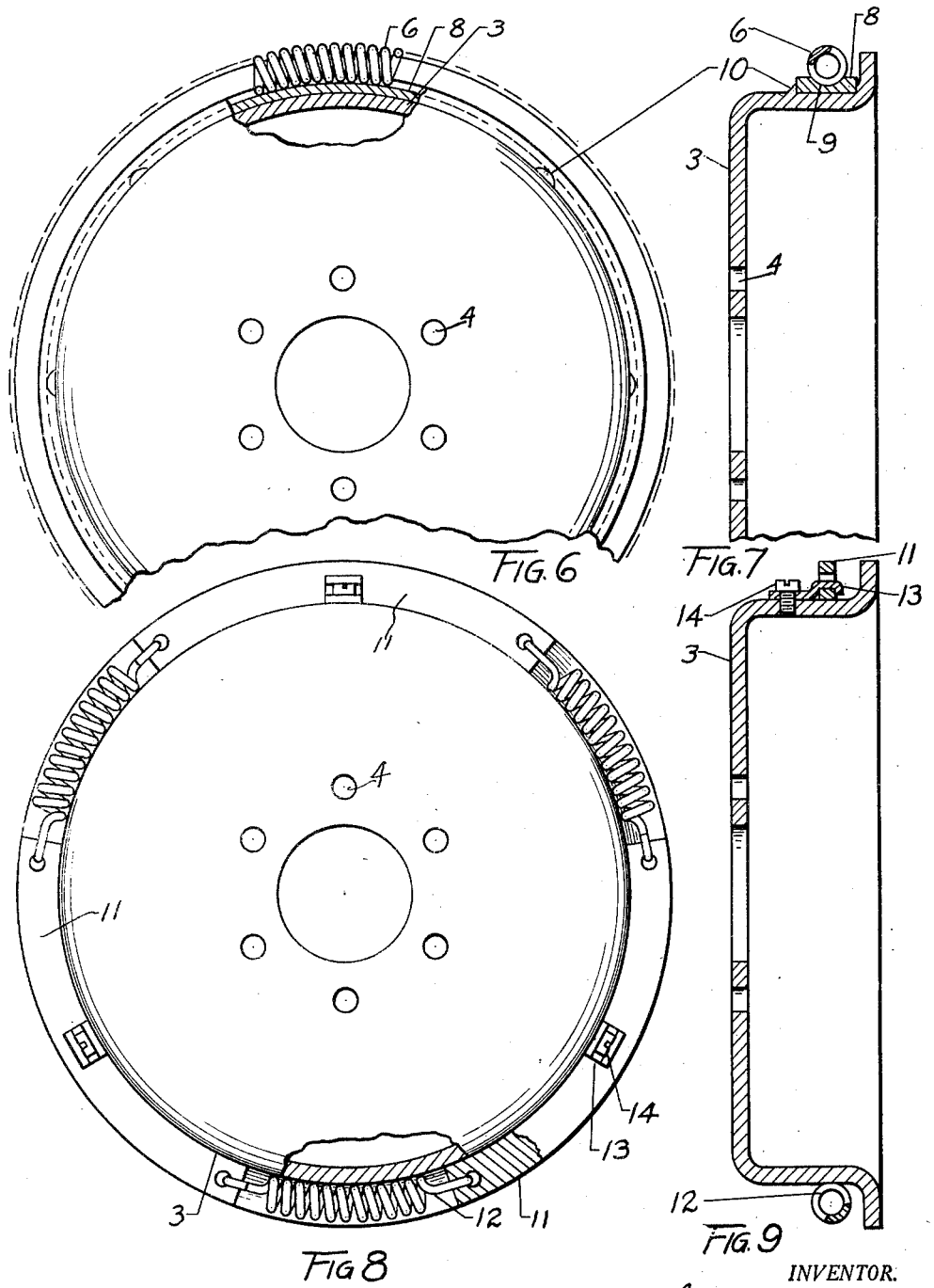
INVENTOR.
Louis C. Huck
BY Francis O. Hardesty
ATTORNEY Patented Feb. 23, 1932

1,846,257

UNITED STATES PATENT OFFICE

LOUIS C. HUCK, OF PLEASANT RIDGE, DETROIT, MICHIGAN

BRAKE DRUM

Application filed November 19, 1928. Serial No. 320,504.

The present invention relates to brakes such as vehicle brakes and more particularly to the construction of the brake drums therefor.

Among the objects of the invention is to dampen possible vibration of the drum and thereby quiet the operation of the brakes.

Another object is to provide additional heat-absorbing and dissipating means for such drums.

Still other objects will readily occur to those skilled in the art upon reference to the following description and the accompanying drawings in which Fig. 1 is a vertical section through a brake drum as if taken on the line 1—1 of Fig. 2.

Fig. 2 is a vertical section on line 2—2 of Fig. 1.

Figs. 3, 4 and 5 show alternate means for connecting the ends of the spring.

Fig. 6 is an elevation showing the drum with part in section showing a form somewhat modified from that shown in Figs. 1 and 2.

Fig. 7 is a vertical central section of the drum shown in Fig. 6.

Fig. 8 is an elevation of a drum showing a modified form.

Fig. 9 is a central vertical section through the drum shown in Fig. 8.

In friction brakes, particularly in vehicle brakes, it has been found that frequently when in operation they develop what is commonly called a "squeal." This "squeal" is often due to the rubbing together of the braking parts with some foreign matter between them, or may be sometimes due to other causes. When these causes or conditions are present and the noise is initiated it is undoubtedly augmented by the vibration of the drum which is usually of a form quite analagous to that of a bell and is usually made of comparatively stiff material so that the vibration is quite rapid and there results the loud, high-pitched noise called "squeal."

It has been found that if the vibration of the drum is interfered with or dampened, such "squeal" is greatly reduced if not entirely eliminated.

In Fig. 1 is shown a brake drum 3 within which is a pair of brake shoes 1 provided with friction material 2 and adapted to be moved into contact with the drum 3 by means of a rotatable cam member 3a. This drum is attached to the wheel or other movable member by means of bolts (not shown) fastened through suitable openings such as are indicated at 4.

The drum 3 is shown as provided with the usual flange 5 which adds to the stiffness of the drum walls and also aids in the dissipation of heat due to the friction between the shoes and the drum.

In Figs. 1 and 2 the drum is shown as provided with a rather strong endless spring 6 wrapped around its outer periphery and either lying in a groove 7 machined in the outer surface, or held in position by peening at intervals the metal of the drum. On Figs. 6 and 7 numeral 10 illustrates the peening of the metal to hold the spring. In all cases the spring will be under rather strong tension when in place so as to exert pressure radially of the drum.

The spring as used is of somewhat smaller relative proportions than is indicated in the drawings but should be a comparatively strong spring. It is of sufficient length to permit its being extended around the drum and have its ends secured together in any suitable manner but preferably in one of the several ways indicated in Figs. 3, 4 and 5. In Fig. 3 hooks 6a are formed on the ends of the spring and these hooked together. In Fig. 4 the end 6b of the spring is shown as tapering and this may be screwed into the other end 6c, the flights of the spring acting as threads. In Fig. 5 the spring ends are shown as connected by means of a short threaded rod 6d which screws into the two spring ends.

Instead of applying the spring directly to the drum as indicated in Figs. 1 and 2, there may be interposed between the drum and spring a band 8 having its ends enjoined and which may be provided in its outer surface with a suitable groove 9 for the spring, which band may be held in place on the drum by peening the metal as indicated at 10. This band may be metal or softer material depending upon whether it is desired to augment the heat dissipation or the noise dampening effect, the metals as a general rule being better heat conductors than the softer non-metallic materials. The band may even be made of sections either of metal or the softer material or of alternating sections of metal and softer material.

A further modification is shown in Figs. 8 and 9 in which short arc shaped pieces of metal 11 are shown as connected by means of short springs 12. In Fig. 8 there are three of the parts 11 and three springs 12, but it should be understood that more may be used if desired and even less in number may be used with good results.

It is contemplated to use under certain conditions a single piece 11 extending nearly around the drum and having its ends connected with a short spring such as is indicated at 12. In this form of the device the parts 11 may be held in place on the drum by means of clips 13 extending through openings in the parts 11 and being themselves fastened to the drum in any suitable way, such as by the screw 14.

It has been found that not only do the spring 6 and other forms of the device greatly reduce the noise, but they have the further advantage of adding to the heat dissipation, and this function is enhanced by the employment of metals for the purpose which are good conductors of heat. On account of the fact that little or no load is taken by these added members they may be made of metals which have a much higher heat conductivity than the metal of the drum and additional heat dissipation from the drum may be accomplished by this means.

Further, it is important that the elements added to the drum be so arranged that a balanced rotation is maintained, that is, the weight distribution about the drum should be substantially uniform.

Now having described the invention and the preferred forms of embodiment thereof, it is to be understood that the said invention is to be limited, not to the specific details herein set forth but only by the scope of the claims which follow.

I claim:—

1. In combination, a brake drum, a metallic resilient ring surrounding said drum and exerting pressure against the periphery thereof, said ring operable to conduct heat from the drum and to dampen noise-producing vibrations.

2. In combination, a brake drum, a resilient ring surrounding the periphery thereof and arranged to exert pressure thereagainst, said ring being made of material of relatively good heat conductivity, said ring operable to conduct heat from the drum and to dampen noise-producing vibrations.

3. In combination, a brake drum having a ring carried thereby and surrounding its outer periphery, said ring being made at least in part of a coiled spring.

4. In combination, a brake drum, a band about the periphery of said drum and a resilient spring element arranged to press said band tightly against said drum.

5. In combination, a brake drum, a grooved band about the periphery of said drum and a resilient spring element in said groove and arranged to press said band tightly against said drum.

6. In combination, a brake drum and an endless helical spring stretched about its outer periphery, said spring operable to dampen noise-producing vibrations in said drum and to aid in cooling.

LOUIS C. HUCK.